UNITED STATES PATENT OFFICE.

MAX MEINHOLD, OF DELAWARE, OHIO.

IMPROVEMENT IN PROCESSES OF PREPARING DOUGH.

Specification forming part of Letters Patent No. 204,065, dated May 21, 1878; application filed December 31, 1877.

*To all whom it may concern:*

Be it known that I, MAX MEINHOLD, of Delaware, in the county of Delaware and State of Ohio, have invented a new and useful Process of Making Bread; and I do hereby declare that the following is a full and clear description of my invention, which will enable others to make and use it.

Bread, as ordinarily manufactured, requires considerable time to "rise," and otherwise be in a fit condition for baking; besides, the dough is liable to sour on account of the yeast used in its manufacture.

My invention consists in an improved process, by which I dispense with the use of yeast, or baking-powder as such, and produce a superior article of bread.

To carry my improved process into execution, I first prepare an extract of hops by boiling down one-half ounce of the best quality of hops with two quarts of water until the quantity is reduced to about three pints, which gives a liquor of the proper strength and color. I then mix four ounces of barley-malt with a like quantity of wheat-flour, and scald this mixture with the boiling hop-liquor, letting the whole stand until lukewarm, when it is placed in an air-tight vessel and left to settle for twenty-four hours, after which it is drawn off and bottled, so as to be always ready for use. This fluid, which, when properly made, does not ferment, I call "hop-liquor."

Next, a dough is made of wheaten flour and water in the ordinary manner, and to this dough I add a suitable quantity of lard, salt, tartaric acid, and baking-soda, the three last-named ingredients being first dissolved in water, while the lard is kneaded into the dough, in a manner well understood.

It improves the quality of the bread to mash a quantity of boiled potatoes with a like quantity of flour, mix this mass with a suitable quantity of water, and stir it into the dough. For dough made with forty pounds of flour about two pounds of boiled potatoes will be sufficient.

When these several ingredients have been thoroughly kneaded to form a uniform and smooth dough a suitable quantity of the hop-liquor is poured in and thoroughly mixed with the dough, after which this is ready for baking. The result is an unfermented bread of superior quality, very nourishing, pleasant to the taste, and which will keep without spoiling for a considerable period.

Having thus described my improvement, I claim and desire to secure by Letters Patent of the United States—

The herein-described process of preparing dough for the manufacture of bread, consisting in, first, preparing a hop-liquor by boiling down a suitable quantity of hops with water, and adding barley-malt and wheat-flour in about the proportions specified; second, preparing a dough from wheaten flour and water in the usual manner; third, mixing with the dough so prepared suitable quantities of lard, salt, tartaric acid, and baking-soda; and, lastly, adding a suitable quantity of the hop-liquor, the preparation of which forms the first step in my process, substantially as described, and for the purpose set forth.

MAX MEINHOLD.

Witnesses:
  G. G. BANKER,
  W. O. WELCH.